Dec. 18, 1956   T. C. SODDY   2,774,444
AIR SEPARATOR
Filed June 10, 1954   2 Sheets-Sheet 1

INVENTOR.
Thomas C. Soddy
BY Rodney Bedell
atty.

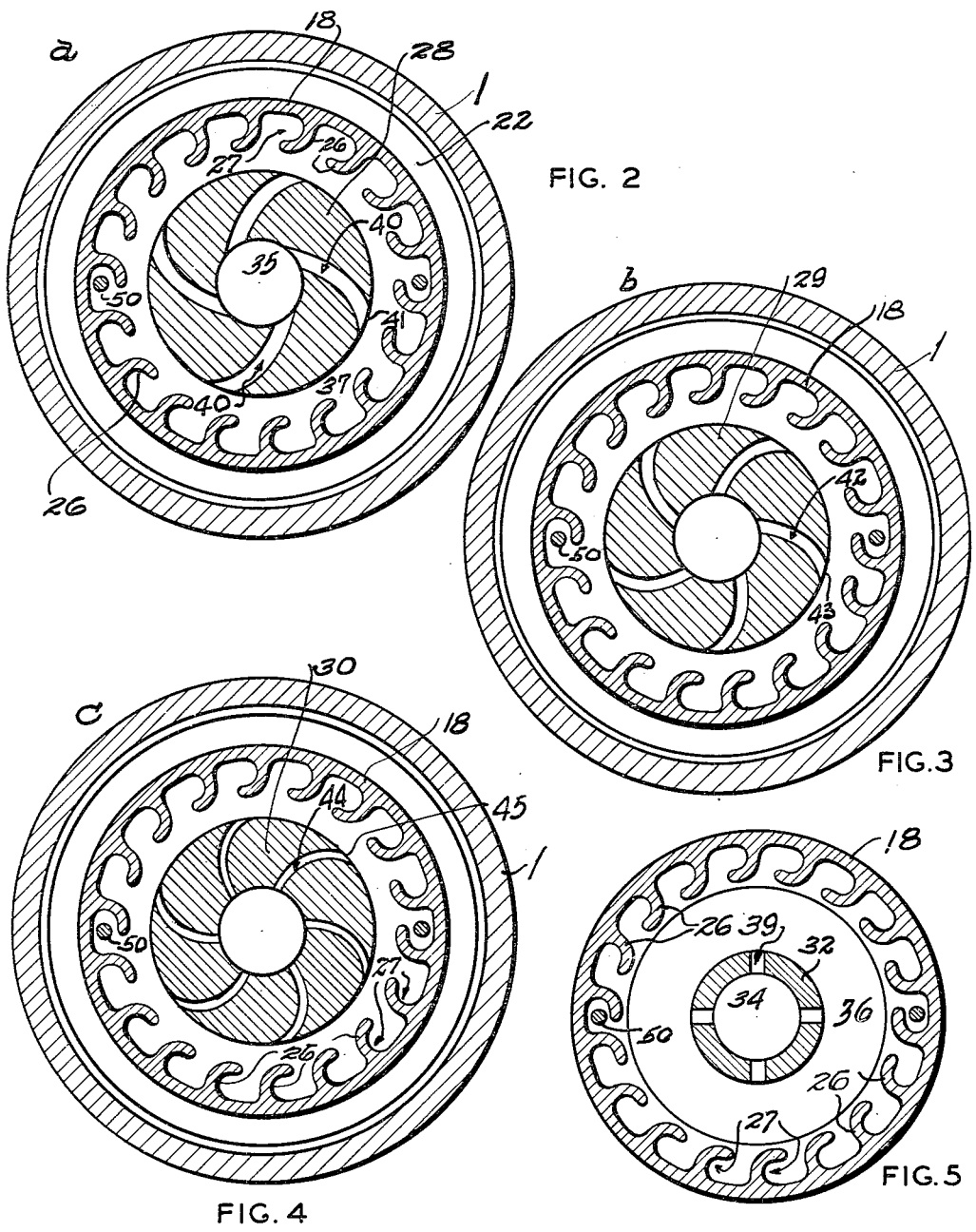

United States Patent Office 2,774,444
Patented Dec. 18, 1956

2,774,444

AIR SEPARATOR

Thomas C. Soddy, Chicago, Ill., assignor to Chicago Railway Equipment Company, Chicago, Ill., a corporation of Illinois Application June 10, 1954, Serial No. 435,752

6 Claims. (Cl. 183—91)

This invention relates in general to air filtration and, more particularly, to an air separator for removing dust, moisture, oil, and other foreign matter from compressed air or like fluid.

An object of this invention is to provide an air cleaner with an elongated casing and means to direct successive streams of air under pressure radially and angularly of the casing at high velocity against intercepting vanes to effect removal of impurities from the air.

Another object is to construct such a separator so that successive streams of air will move through different discharge passageways selectively adapted to more effectively remove undesirable particles of varying weight.

Another object is to provide a separator adapted for removing foreign matter by centrifugal force which will effectively cleanse the air despite varying rates of flow of the treated air.

A further object is to provide a separator which incorporates an intake chamber of larger cross section area than the supply line to permit abrupt expansion of entering laden air for inducing the condensation of entrained moisture vapor.

Another object is to provide a separator which does not embody moving parts and hence does not require a driving motor and is not subject to wear or other difficulties common to moving mechanism; which may be thoroughly cleaned while fully assembled; and which is economical in use.

An additional object is to provide a separator which incorporates a plurality of series of air jetting ports which are of progressively decreasing cross section and arranged so that the openings will be used for emission of impure particles of corresponding size, whereby the possibility of clogging is substantially eliminated.

A further object is to provide a separator which embodies a tortuous path for travel of air therethrough for implementing the cleansing action, and which is so arranged as to cause little or no drop in pressure of the air.

These and other detailed objects are attained by the structure illustrated in the accompanying drawings, in which:

Figure 2 is a transverse horizontal section taken on the line 2—2 of Figure 1.

Figure 3 is a horizontal transverse section taken on the line 3—3 of Figure 1.

Figure 4 is a horizontal section taken on the line 4—4 of Figure 1.

Figure 5 is a horizontal section taken on the line 5—5 of Figure 1.

Figure 1:
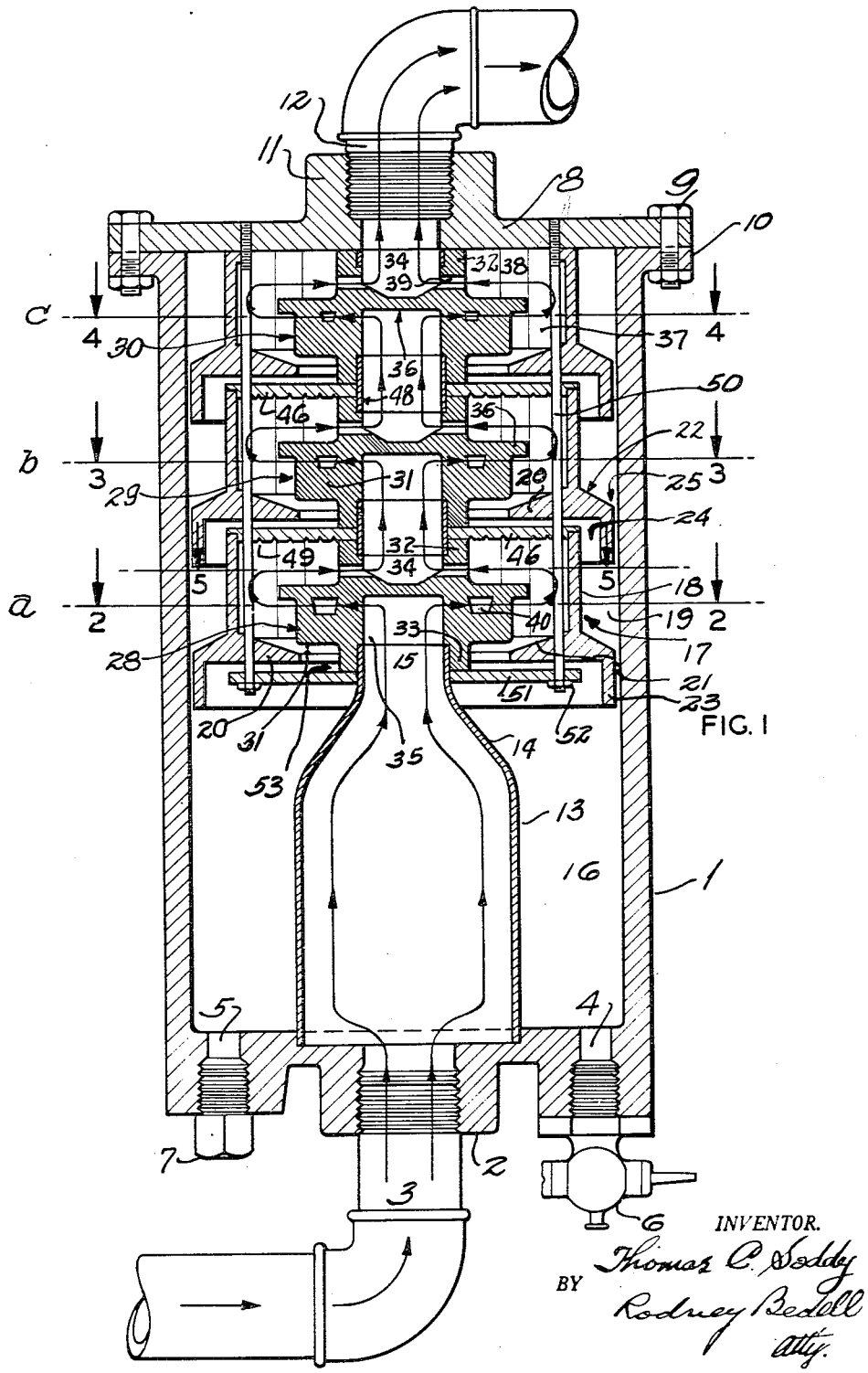
Figure 1 is a vertical section through an air separator constructed in accordance with the present invention.

The air separator comprises a cylindrical casing 1, having centrally of its lower end an air inlet formed by a boss 2 tapped for engagement to an air supply pipe 3, proceeding from a source of compressed air or like fluid. Located in the bottom of casing 1 on opposite sides of the inlet are drain openings 4, 5 provided with a drain cock 6 and a plug 7, respectively. A closure plate 8 is detachably engaged on the upper end of casing 1 by bolts 9 passing through registered openings in said plate 8 and in a peripheral flange 10 on casing 1. Formed in closure plate 8 is an air outlet defined by an upwardly projecting boss 11 tapped for securement to a clean-air discharge pipe 12, said air outlet being axially aligned with the air inlet.

Within the lower portion of casing 1 is an intake chamber 13 of greater diameter at its lower end than the diameter of the air inlet opening of boss 2 so that entering, compressed fluid is immediately permitted to expand for conducing to the condensation of entrained moisture. At its upper end, intake chamber 13 tapers to a neck portion 14 having a discharge opening 15 of substantially equal diameter to the air inlet. The space between chamber 13 and casing 1 forms a collecting trap 16 for accumulating dust, moisture, and other foreign matter removed from the air by the separator, which accumulations can be periodically withdrawn through drain opening 4 or constantly withdrawn by use of automatic drain trap.

Within the upper portion of casing 1 and concentric therewith is a series of cleaning units a, b, c, arranged one above the other. For purposes of illustration, three such cleaning units are shown in the drawing. However, it should be understood that depending upon the requirements of use, additional cleaning units may be readily incorporated into the air separator.

Each cleaning unit a, b, c, comprises a cup member 17 being open at its upper and lower ends and having an upstanding annular wall 18 of less diameter than casing 1 to provide an intervening space 19 for gravity flow therethrough of foreign matter removed from the air for deposition within trap 16. Integrally formed at the lower end of wall 18 is a base portion 20 extending inwardly and outwardly from wall 18 with its upper surfaces being downwardly inclined as it 21, 22, respectively, for direction of extracted impurities. Depending from the base 20 of each cup 17 is a peripheral flange or skirt 23 spaced outwardly and surroundingly of the upper end of wall 18 of the cleaning unit immediately beneath and spaced proximate the inner face of casing 1 for respectively defining inner and outer annular passages 24, 25, the latter communicating with adjacent spaces 19.

Provided on the inner face of walls 18 of each cup 17, throughout the extent thereof, is a series of vanes 26 projecting inwardly and of arcuate character to provide bucket-like recesses 27 with the adjacent portion of wall 18.

Provided for disposition within the cup 17 of each cleaning unit a, b, c, is an air distributor 28, 29, 30, respectively, each of which comprises a short, generally cylindrical intermediate body portion 31 having axially aligned upper and lower extensions 32, 33 of reduced diameter; lower extension 33 passes through the bottom opening of the associated cup 17. Said upper and lower extensions 32, 33 form air outlet and air inlet ducts 34, 35, respectively, which are separated by a circular baffle 36 forming the top of intermediate portion 31 and projecting at its edges beyond the outer face thereof.

Air distributors 28, 29, 30 are of less diameter through their point of greatest cross section than walls 18 of cups 17 to cause the formation of a peripheral chamber 37 about the intermediate portions 31 and an enlarged upper chamber 38 above baffle 36 and communicating with the associated air outlet duct 34 through openings 39 at 90° intervals in upper extensions 32.

Provided in the intermediate portion 31 of the lowermost air distributor 28 are a plurality of radial passageways 40 in communication at their inner ends with the related air inlet duct 35 and opening into peripheral chamber 37 through ports 41. Said passageways 40 are of relatively large cross section and are curved for imparting a curvilinear motion to air discharged therethrough, which air is diverted thereinto by baffle 36. Air distributor 29 of cleaning unit *b* is provided with radial passageways 42 having ports 43 at their outer ends; said passageways 42 are greater in number than passageways 40 and are of less cross sectional area and degrees of curvature than passageways 40. In air distributor 30 of the uppermost cleaning unit *c*, radial passageways 44 are provided leading from the associated inlet duct 35 to discharge ports 45; said passageways 44 are greater in number than passageways 42 and are of slightly less cross section and degrees of curvature than passageways 42. The particular arrangement of cleaning units in the air separator in the present invention provides for a progressive increase in total number of passageways and a progressive decrease in cross section and curvature thereof, the more elevated the particular distributor may be.

Disposed upon the upper end of cups 17 of cleaning units *a*, *b*, is a cover-forming disc 46 which is centrally apertured for registration with the air inlet and air outlet ducts 35, 34, respectively, of the immediately adjacent distributors 28, 29, 30, respectively, as the case may be. The upper end of upper extension 32 of the distributor therebelow abuts against the under face of the superimposed disc 46 while the lower end of lower extension 33 of the distributor thereabove rests upon the upper face of the same disc. To prevent accidental re-entry of removed contaminants into the upwardly progressing air, a ferrule 48 is provided for connecting the air inlet duct and air outlet duct of the adjacent distributors. The under face of each disc 46 has formed therein a series of concentric grooves 49.

A pair of tie rods 50 maintain cleaning units *a*, *b*, *c*, in operative relation; said tie rods being threadedly received at their upper ends within closure plate 8 and passing through aligned openings in cups 17 and discs 46 with the lower ends of said rods extending through openings in a base plate 51 for engagement with retaining nuts 52.

With reference now being made to Figure 1, it will be seen that discs 46 and base plate 51 are spaced apart from the under face of the base portion of the cup 17 directly above. This spacing, designated 53, forms a connecting path between the inner annular passage 24 and the peripheral chamber in cup 17 above through the open lower end thereof.

In operation of the air separator, unclean or laden compressed air will travel upwardly from inlet 2, moving through intake chamber 13 and then successively through cleaning units *a*, *b*, *c*, for discharge in a fully cleansed state through outlet 11 for delivery to the particular compressed air device or mechanism to be operated thereby.

Within intake chamber 13, the compressed air is allowed to abruptly expand, with reduction in velocity, to allow moisture in vapor form carried thereby to condense. The air will regain velocity as it moves through the narrow neck 14 and will maintain axial flow through air inlet duct 35 of distributor 28 of the lowest cleaning unit *a*, wherein it will be deflected by baffle 36 radially outwardly through passageways 40 for jetting by ports 41 into the surrounding peripheral chamber 37. The emitted stream of air will be directed into a curvilinear path by passageways 40 and will impinge upon vanes 26, which will enhance the angular or circular character of air flow in chamber 37 with centrifugal force being developed thereby. The centrifugal force will cause ejection from the air of particles having a greater specific gravity than the air, which particles will drop downwardly through the bottom opening in cup 17 for collection in trap 16. The air will then rise and move through upper chamber 38 for discharge through openings 39 and air outlet duct 34 into the next upper cleaning unit.

As shown, the cleaning units each present a tortuous path for the air to travel since each baffle 36 in conjunction with the adjacent passageways 40, 42, 44, as the case may be, causes a first sharp change of direction with an attendant increase in velocity since such passageways are of less cross section than inlet ducts 35. Upon discharge into peripheral chambers 37, the air is permitted to expand and, in addition to being directed into a circular path, will also effect a further change of direction by movement upwardly around the edge of baffle 36 into upper chamber 38 and then be forced to turn inwardly substantially along a path normal to the axis of casing 1 for return through openings 39 to outlet duct 34 from which it moves axially of the unit. In entering upper chambers 38, the air will strike against the corrugated under face of discs 46, which will have a scrubbing effect upon the air causing dust an dlike particles to be separated therefrom. The air will thus follow a similar circuitous course through each successive cleaning unit with attendant sudden increases and decreases in velocity resulting from the peculiar arrangement of chambers and passageways of varying dimensions. As above described, distributors 28, 29, 30 of cleaning units *a*, *b*, *c*, respectively, differ by having successively more passageways which are of decreasing cross section so that increased velocity will be imparted to the air streams moving therethrough with the centrifugal force of such streams being correspondingly increased. Therefore, since the centrifugal force on a particle increases as the weight and velocity of a particle increases, it will be seen that the heavier and larger impure particles will be removed in the lowest cleaning unit *a*, while the lightest and finest particles will be extracted by the top cleaning unit *c*. Although velocity of the air through passageways 40 in distributor 28 is relatively low, due to the cross section of such passageways, the same will impart sufficient velocity to the largest particles for ejection thereof through centrifugal force. The smaller and lighter particles will remain entrained and travel into cleaning unit *b*, wherein an increased velocity will be imparted thereto by the relatively decreased cross section of passageways 42 so that particles of intermediate weight will be removed by the developed centrifugal force. The smallest and lightest particles will enter the last stage or top cleaning unit *c* and be provided adequate velocity by the relatively constricted passageways 44 for extraction by centrifugal action.

Particles so removed will descend by gravity through the open lower end of the surrounding cup 17 for movement through inner annular passageways 24, spaces 19, and outer annular passageways 25, for collection in trap 16.

With the progressive decrease in cross section of the radial passageways and ports of distributors 28, 29, 30, the danger of clogging is substantially eliminated since the larger particles are taken out at the larger openings and the smaller particles at the smaller openings.

The rate of flow of entering air, which is, of course, dependent on line pressure and compressor capacity, may vary considerably, due to the particular pneumatic mechanism involved and also may fluctuate under any specified pressure. Since the rate of flow directly effects the air velocity through the passageways of distributors 28, 29, 30, the same will, in turn, affect the developed centrifugal forces. The air separator of the present invention will effectively provide air filtration despite any such variations as the smaller passageways in the upper cleaning units will cause sufficient velocity to be created with relatively low rates of air flow for removal of impurities by centrifugal action, while the lower cleaning unit, as *a*, with its relatively larger passageways, will reliably accommodate higher rates of flow.

As stated above, additional cleaning units may be readily incorporated into the air separator, which units are provided with openings of varying cross section for operation in accordance with the principles expressed.

The three-stage cleansing action, as provided by cleaning units a, b, and c, is merely exemplary of the basic operation of the air separator.

It is to be noted that the air separator does not embody any moving parts and is, hence, not subject to breakdown and wear with the customary required replacement of parts, so that economical operation is assured. The air separator does not require dismantling for cleaning, but may be thoroughly cleansed by submergence in a fully assembled state in a suitably prepared path.

The details of construction may be varied without departing from the spirit of the invention and the exclusive use of those modifications coming within the scope of the claims is contemplated.

What is claimed is:

1. An air separator comprising an elongated casing having an inlet near one end for laden air and a discharge opening near the other end for cleansed air, at least two cleaning units provided in said casing and arranged sequentially with said air inlet for movement therethrough of the air to the discharge opening, each cleaning unit comprising an air distributing member having a plurality of passageways disposed in a plane normal to the longitudinal axis of the casing and forming a part of the path of travel of the air through the separator, interceptor vanes on the casing forming bucket-like recesses opposing but spaced from the outer ends of said passageways, said passageways being curved, whereby relatively heavy particles in the air stream passing therethrough will be directed into said recesses, the cross section area of the passageways in the air distributing member of the cleaning unit nearest the air inlet being greater than that of the passageways in the next air distributing member.

2. An air separator comprising an elongated casing having an inlet near one end for laden air and a discharge opening near the other end for cleansed air, at least two cleaning units provided in said casing and arranged sequentially with said air inlet for movement therethrough of the air to the discharge opening, each cleaning unit comprising an air distributing member having a plurality of passageways disposed in a plane normal to the longitudinal axis of the casing and forming a part of the path of travel of the air through the separator, interceptor vanes on the casing forming bucket-like recesses opposing but spaced from the outer ends of said passageways, said passageways being curved, whereby relatively heavy particles in the air stream passing therethrough will be directed into said recesses, the passageways in the air distributing member in the cleaning unit nearest the air inlet being less in number and of greater cross section area than the passageways in the next air distributing member.

3. An air separator comprising a casing having an inlet and an outlet, at least three cleaning units provided in said casing and arranged sequentially with the inlet for movement therethrough of the air to the outlet, each cleaning unit comprising an air distributing member having a plurality of passageways disposed in a plane normal to the longitudinal axis of the casing and forming a part of the path of travel for all of the air through the separator, said passageways being curved, whereby the air stream passing therethrough will be angularly directed, the passageways of the various air distributing members being of decreasing cross section area, the nearer the associated cleaning unit is located to the casing outlet.

4. In an air separator, an elongated upright casing with an air entrance near its lower end and an air exit near its upper end, a plurality of cleaning units arranged one above the other within the casing, each unit comprising an annular wall spaced from the casing, and forming therewith an impurity discharge passage, and a central separator member surrounded by and spaced inwardly from said annular wall and having a downwardly opening axial air inlet chamber and an upwardly opening axial air outlet chamber and including a plurality of horizontal radiating discharge passageways leading from the upper portion of said inlet chamber, there being a baffle projecting above and beyond the outer ends of said passageways and there being a plurality of air return openings above the baffle and leading horizontally to the lower portion of said axial air outlet chamber, the cross section area of the individual air discharge passageways and air return openings of one cleaning unit differing from the cross section areas of the corresponding passageways and openings of another unit.

5. In an air separator according to claim 4, interceptor vanes projecting inwardly from the cleaning unit annular wall and positioned opposite to but spaced from the outer ends of the corresponding discharge passageways.

6. In an air separator according to claim 4, interceptor vanes projecting inwardly from the cleaning unit annular wall and positioned opposite to but spaced from the outer ends of the corresponding discharge passageways, said vanes and discharge passageways being arcuate transversely of the separator with their respective air discharge stream engaging surfaces concaved in opposite directions.

References Cited in the file of this patent

UNITED STATES PATENTS

| | | |
|---|---|---|
| 300,191 | Beal | June 10, 1884 |
| 429,347 | Haskell | June 3, 1890 |
| 696,601 | Sims | Apr. 1, 1902 |
| 1,182,220 | Seeger | May 9, 1916 |
| 1,228,237 | Oleson | May 29, 1917 |
| 1,639,538 | Schutz | Aug. 16, 1927 |
| 1,795,695 | Wyllie | Mar. 10, 1931 |
| 1,811,043 | Donaldson | June 23, 1931 |
| 2,399,842 | Warner | May 7, 1946 |

FOREIGN PATENTS

| | | |
|---|---|---|
| 512,989 | Germany | Nov. 22, 1930 |